March 3, 1964  P. B. ZEIGLER ETAL  3,123,350
ARCUATE SLIDING PILLAR INDEPENDENT WHEEL SUSPENSION
Filed Feb. 19, 1962
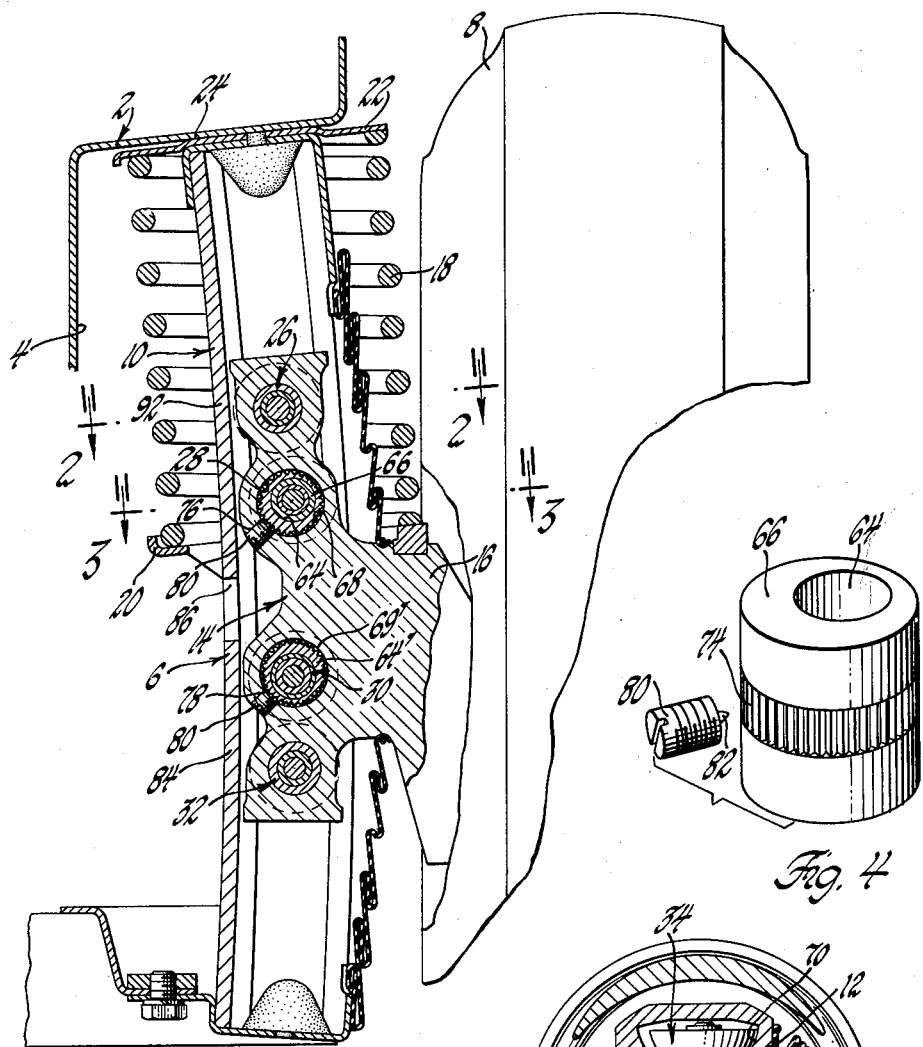
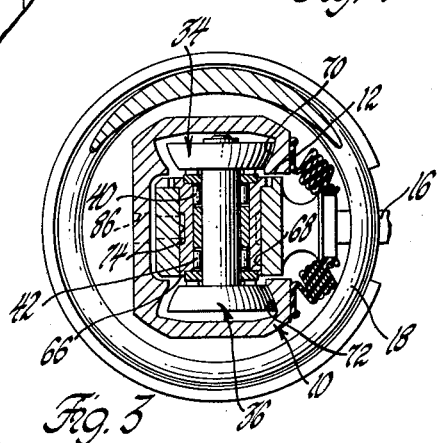
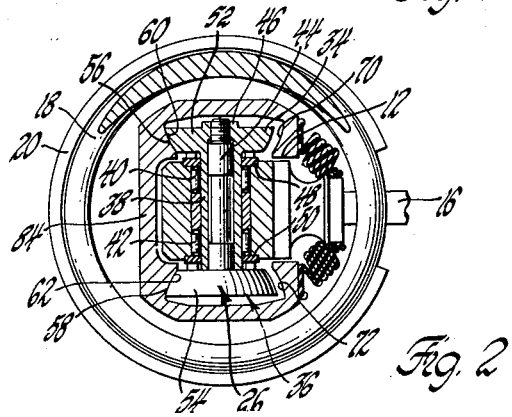
INVENTORS
Philip B. Zeigler &
BY Robert L. White
W. F. Wagner
ATTORNEY

United States Patent Office 3,123,350
Patented Mar. 3, 1964

3,123,350
ARCUATE SLIDING PILLAR INDEPENDENT WHEEL SUSPENSION
Philip B. Zeigler and Robert L. White, Saginaw, Mich., assignors to General Motors Corporation, Detroit, Mich., a corporation of Delaware
Filed Feb. 19, 1962, Ser. No. 174,075
11 Claims. (Cl. 267—60)

This invention relates to vehicle suspension and more particularly to vehicle suspension of the sliding pillar type.

An object of the invention is to provide an improved vehicle suspension.

Another object is to provide an improved sliding pillar type suspension for vehicle wheels.

A further object is to provide a sliding pillar wheel suspension having improved and simplified means for obtaining and maintaining close tolerance anti-friction bearing engagement between the relatively movable parts of the suspension.

Yet another object is to provide a sliding pillar suspension wherein the pillar is reciprocably mounted in an arcuate vertically extending channel section guide member and is operably connected thereto by a plurality of vertically spaced longitudinally extending anti-friction rollers, certain of which are eccentrically displaceable about their axis of rotation to provide close tolerance rolling engagement with the arcuate member.

Still a further object is to provide a suspension of the type described wherein the entire assembly is readily mountable and demountable as a unit.

A still further object is to provide a sliding pillar suspension assembly wherein the elastic medium is disposed in surrounding relation with one end of the pillar.

Still another object is to provide a demountable assembly of the type described wherein resilient compression and rebound stops are mounted within the channel member at opposite ends thereof.

These and other objects, advantages, and features of the invention will become more fully apparent as reference is had to the accompanying specification and drawing wherein:

FIG. 1 is a fragmentary front elevational view, partly in section and with parts broken away, illustrating a sliding pillar suspension in accordance with the invention;

FIG. 2 is a view looking in the direction of arrows 2—2 of FIG. 1;

FIG. 3 is a view looking in the direction of arrows 3—3 of FIG. 1; and

FIG. 4 is a perspective view of the component of the suspension enabling adjustment to obtain precision engagement between the sliding pillar and arcuate guideways therefor.

Referring now to the drawings and particularly FIG. 1, reference numeral 2 designates generally the rear side portion of a unit body and frame for a vehicle. Body structure 2 is formed to provide a laterally inwardly indented vertically elongated cavity 4 adapted to receive a sliding pillar type suspension assembly 6 for a vehicle wheel 8. Suspension assembly 6 includes a forged or rolled channel section guide member 10 which in front elevation is curved to form an arc generated from an imaginary point located a predetermined distance at the opposite side of the vehicle. As seen best in FIGS. 2 and 3, guide member 10 is generally C-shaped in cross section with the open throat portion 12 facing the outboard side of the vehicle. Disposed within guide member 10 is a forged pillar-like element 14 which includes an integral arm portion 16 extending outwardly through opening 12 and rotatably supporting wheel 8. Pillar-like element 14 is adapted for reciprocable motion within guide member 10 to accommodate vertical deflection of wheel 8. To resiliently support body 2 relative to wheel 8, a coil spring is disposed in surrounding relation with the upper portion of member 10. At its lower end, spring 18 engages a lower spring seat 20 surrounding guide member 10 and secured to pillar 14. At its upper end spring 18 bears against an upper spring seat 22 attached to the horizontal upper wall portion 24 of body cavity 4.

In order to provide smooth precision movement of pillar 14 along the arcuate path defined by guide 10 with minimum friction, according to the present invention a plurality of horizontally disposed roller assemblies 26, 28, 30 and 32 extend longitudinally through pillar 14 at vertically spaced intervals.

As seen in FIG. 2, each assembly 26 and 32 includes roller elements 34 and 36 located at opposite sides of pillar 14. Element 34 includes a hollow stem portion 38 extending through pillar 14 and supported therein by needle bearings 40 and 42. Element 36 includes a solid stem portion 44 which extends through tubular stem portion 38 of element 34. The extreme end of stem portion 44 threadably engages the hub 46 of roller 34 to secure the two elements in rigid relation and to establish engagement with thrust members 48 and 50. In assembled relation, elements 34 and 36 are rotatable as a unit relative to pillar 14. The extreme outer ends of each of elements 34 and 36 are provided with circular head portions 52 and 54 having peripheral surfaces 56 and 58 which are arcuately profiled in cross section for rolling engagement with corresponding inner arcuate guideways 60 and 62 formed in guide member 10.

Roller assemblies 28 and 30 correspond identically in construction with assemblies 26 and 32 insofar as the details of form and connection together are concerned. However, in accordance with the present invention, needle bearing assemblies 40 and 42 for assemblies 28 and 30 are mounted in a bore 64 of cylindrical element 66 which in turn is rotatably disposed in an aperture 68 or 69' formed in pillar 14. According to the invention, the axis of bore 64 is eccentric to the axis of revolution of element 66 so that rotation of the latter in aperture 68 causes lateral displacement of the axis of rotation of roller elements 34 and 36 of assemblies 28 and 30, until rollers 34 and 36 engage the outer arcuate guideways 70 and 72 while the rollers 34 and 36 engage the inner guideways 60 and 62, as previously mentioned.

According to another feature of the invention, the axially central portion of cylindrical element 66 is provided with circumferential uniform spaced notches 74 which, when element 66 is assembled in aperture 68, are aligned with threaded openings 76 and 78 in pillar 14. Threaded openings 76 and 78 are adapted to receive set screws 80 having end nibs 82 adapted to threadably engage one of the notches 74 to maintain the element 66 in the desired angular position of adjustment.

In order to effect precise adjustment of rolling engagement between pillar 14 and guide 10 after the suspension is in assembled relation on the vehicle, the inner wall 84 of guide 10 is formed with an opening 86 located vertically midway between the upper and lower end of guide 10. To adjust assembly 28, the sprung mass of the vehicle is elevated sufficiently to bring the adjustment screw into alignment with the opening 86. The adjustment screw is then removed and a suitable tool such as a screwdriver is inserted in the threaded opening 76 and manipulated so as to effect successive prying engagement with one or more of the notches 74 causing rotation of cylinder 66 and lateral displacement of rollers 34 and 36 into bearing engagement with guideways 70 and 72. The screw is then replaced and tightened until the nib 82 seats in the nearest notch 74. The foregoing operation is then repeated with respect to assembly 30 after the wheel has been elevated until adjustment screw 80 is in alignment with opening 86.

While but one embodiment of the invention has been shown and described, it will be apparent that other changes and modifications may be made therein. It is, therefore, to be understood that it is not intended to limit the invention to the embodiment shown, but only by the scope of the claims which follow.

We claim:

1. A sliding spindle wheel suspension assembly comprising, an elongated guide member of generally C-shaped cross section, a pillar element reciprocably disposed in said guide member, a wheel rotatably mounted on said pillar element, at least three roller assemblies mounted in said pillar and engageable with said guide member for rotation on vertically spaced axes parallel to the plane of rotation of said wheel, means carried by said pillar for eccentrically adjusting the axis of at least one of said assemblies to provide precise tracking between said pillar and said guide, and spring means yieldably biasing said pillar toward one end of said guide.

2. A sliding spindle wheel suspension assembly comprising, a vertically extending elongated guide member curved in front elevation and generally C-shaped in cross section, a pillar element reciprocably disposed in said guide member, a wheel rotatably mounted on said pillar element, at least three roller assemblies mounted in said pillar and engageable with said guide member for rotation on vertically spaced axes parallel to the plane of rotation of said wheel, means carried by said pillar for eccentrically adjusting the axis of at least one of said assemblies to provide precise tracking between said pillar and said guide, and spring means yieldably biasing said pillar toward the lower end of said guide.

3. A sliding spindle wheel suspension assembly comprising, a vertically extending elongated guide member curved in front elevation and generally C-shaped in cross section, a pillar element reciprocably disposed in said guide member, a wheel rotatably mounted on said pillar element, means forming spaced apart guideways in said guide member, a plurality of roller assemblies mounted in said pillar and engageable with said guideways for rotation on vertically spaced axes parallel to the plane of rotation of said wheel, means carried by said pillar for eccentrically adjusting the axis of a vertically intermediate one of said assemblies to provide precise tracking between said pillar and said guide, and spring means yieldably biasing said pillar toward the lower end of said guide.

4. In a motor vehicle, a sliding spindle wheel suspension assembly comprising, an elongated guide member of generally C-shaped cross section, said guide member being curved in a vertical plane transverse of the vehicle, a pillar element reciprocably disposed in said guide member, a wheel rotatably mounted in said pillar element, a first pair of vertically spaced roller assemblies mounted in said pillar on horizontal axes parallel to the plane of rotation of said wheel, each of said first pair of roller assemblies including spaced apart circular head portions adapted for interlocking rolling engagement with said guide member, a pair of cylindrical elements carried by said pillar and rotatable on horizontal vertical spaced axes, a second pair of roller assemblies rotatably mounted in said cylindrical elements on axes eccentric to the outer surface of revolution thereof, each of said second pair of roller assemblies including spaced apart circular head portions adapted for interlocking rolling engagement with said guide member, and means for adjusting the angular position of said cylindrical elements to effect lateral displacement of said second pair of roller assemblies to provide precision bearing engagement between said circular head portions and said guide member.

5. In a motor vehicle, a sliding spindle wheel suspension assembly comprising, a vertically extending guide member of generally C-shaped cross section fixed to said vehicle, said guide member being formed with forwardly facing and rearwardly facing curvilinear guideways defining a path in a vertical plane transverse of the vehicle, a pillar element reciprocably disposed in said guide member, a wheel rotatably mounted in said pillar element, a pair of vertically spaced roller assemblies mounted in said pillar on horizontal longitudinally extending axes parallel to the plane of rotation of said wheel, each of said first pair of roller assemblies including spaced apart circular head portions engageable with said guideways, a pair of cylindrical elements carried by said pillar and rotatable on horizontal vertical spaced axes, a second pair of roller assemblies rotatably mounted in said cylindrical elements on axes eccentric to the outer surface of revolution thereof, each of said second pair of roller assemblies including spaced apart circular head portions engageable with said guideways, and means for adjustably rotating said cylindrical elements to effect lateral displacement of said second pair of roller assemblies to provide precision bearing engagement with said guide member.

6. The structure set forth in claim 5 wherein each curvilinear guideway includes laterally opposed surfaces of arcuate cross section.

7. The structure set forth in claim 6 wherein the opposed surfaces of arcuate cross section converge toward the center of the guide member to provide longitudinally interlocking rolling engagement with said circular head portions.

8. The structure set forth in claim 5 including means for securing said cylindrical elements in adjusted position.

9. The structure set forth in claim 8 wherein said guide member is provided with an opening providing access to said means for securing said cylindrical elements in adjusted position.

10. The structure set forth in claim 9 wherein said securing means comprises a threaded member which upon removal provides access to said means for adjusting the angular position of said cylindrical members.

11. The structure set forth in claim 10 wherein said adjustment means comprises a plurality of notches formed circumferentially on the outer surface of revolution of said cylindrical element.

References Cited in the file of this patent

UNITED STATES PATENTS 2,383,195    Horman _____ Apr. 21, 1945

FOREIGN PATENTS 636,319    Germany _____ Oct. 7, 1936
129,916    Great Britain _____ July 24, 1919